(12) United States Patent
Cox et al.

(10) Patent No.: US 9,768,579 B2
(45) Date of Patent: Sep. 19, 2017

(54) LASER

(71) Applicant: Laser Quantum Ltd, Stockport (GB)

(72) Inventors: Alan Cox, Wilmslow (GB); Jean-Charles Cotteverte, Heald Green (GB)

(73) Assignee: LASER QUANTUM INC., San Jose, CA (US)

( * ) Notice: Subject to any disclaimer, the term of this patent is extended or adjusted under 35 U.S.C. 154(b) by 0 days.

(21) Appl. No.: 15/008,924

(22) Filed: Jan. 28, 2016

(65) Prior Publication Data
US 2016/0226211 A1   Aug. 4, 2016

(30) Foreign Application Priority Data
Jan. 29, 2015   (GB) .................................. 1501473.1

(51) Int. Cl.
*H01S 3/08* (2006.01)
*H01S 3/06* (2006.01)
(Continued)

(52) U.S. Cl.
CPC ............ *H01S 3/08072* (2013.01); *H01S 3/07* (2013.01); *H01S 3/1022* (2013.01); *H01S 3/0602* (2013.01);
(Continued)

(58) Field of Classification Search
CPC ..... H01S 3/07; H01S 3/08054; H01S 3/08072
See application file for complete search history.

(56) References Cited

U.S. PATENT DOCUMENTS

| 5,111,468 A | 5/1992 | Kozlovsky et al. |
| 5,177,755 A | 1/1993 | Johnson |

(Continued)

FOREIGN PATENT DOCUMENTS

| EP | 0850501 | 7/1998 |
| EP | 2747219 | 6/2014 |

(Continued)

OTHER PUBLICATIONS

Albert Di Lieto et al., High Power Diffraction-Limited Nd: YVO4 Continuous-Wave Lasers at 1.34 um, IEEE Journal of Quantum Electronics, vol. 39, Issue 7, Jul. 2003, pp. 903-909.
(Continued)

*Primary Examiner* — Michael Carter
(74) *Attorney, Agent, or Firm* — Faegre Baker Daniels LLP

(57) ABSTRACT

A laser comprises a first end mirror and a second end mirror defining an optical cavity therebetween, a first gain medium and a second gain medium positioned in the optical cavity, at least one radiation source configured to provide pump radiation to the first and second gain media, wherein the pump radiation comprises a first pump beam directed to be incident on the first gain medium and a second pump beam directed to be incident on the second gain medium so as to stimulate emission of radiation from the first and second gain media thereby establishing a laser beam in the optical cavity and a control apparatus operable to adjust a property of at least one of the first and second pump beams and thereby control a thermal lens of at least one of the first and second gain media so as to substantially remove an instability zone from the power curve of the laser.

19 Claims, 5 Drawing Sheets

(51) Int. Cl.
  *H01S 3/07*   (2006.01)
  *H01S 3/102*  (2006.01)
  H01S 3/081   (2006.01)
  H01S 3/0941  (2006.01)

(52) U.S. Cl.
  CPC ......... *H01S 3/0817* (2013.01); *H01S 3/08045* (2013.01); *H01S 3/09415* (2013.01)

(56) References Cited

U.S. PATENT DOCUMENTS

| | | | |
|---|---|---|---|
| 5,272,713 | A | 12/1993 | Sobey et al. |
| 6,151,343 | A | 11/2000 | Jurgensen |
| 7,542,501 | B2 * | 6/2009 | Kumkar ............... H01S 3/07 372/69 |
| 2002/0085608 | A1 * | 7/2002 | Kopf ............... H01S 3/09415 372/75 |
| 2006/0215716 | A1 | 9/2006 | Luo et al. |
| 2007/0053403 | A1 | 3/2007 | Cox |
| 2008/0225922 | A1 | 9/2008 | Fujikawa et al. |
| 2008/0310475 | A1 | 12/2008 | Pesle |

FOREIGN PATENT DOCUMENTS

| | | |
|---|---|---|
| JP | 2006237530 | 9/2006 |
| WO | 9635246 | 11/1996 |

OTHER PUBLICATIONS

UKIPO Search Report for Application No. GB1501473.1 dated Oct. 5, 2015, 7 pages.

\* cited by examiner

LASER

CROSS REFERENCE TO RELATED APPLICATION

This application claims priority under 35 U.S.C. §119 to United Kingdom Patent Application No. 1501473.1, filed Jan. 29, 2015, the disclosure of which is expressly incorporated herein by reference in its entirety.

FIELD

The present invention relates to a laser. In particular the present invention relates to a solid state laser.

A solid state laser is a laser which uses a solid state gain medium. The solid state gain medium may, for example, comprise a crystal containing a dopant. A solid state gain medium is typically optically pumped. For example, the solid state gain medium may be pumped with radiation from one or more laser diodes. Such an arrangement is known as a diode-pumped solid state laser (DPSSL).

It is an object of the present invention to provide a solid state laser which obviates or mitigates a disadvantage associated with known solid state lasers.

SUMMARY OF THE INVENTION

According to a first aspect of the invention there is provided a laser comprising a first end mirror and a second end mirror defining an optical cavity therebetween, a first gain medium and a second gain medium positioned in the optical cavity, at least one radiation source configured to provide pump radiation to the first and second gain media, wherein the pump radiation comprises a first pump beam directed to be incident on the first gain medium and a second pump beam directed to be incident on the second gain medium so as to stimulate emission of radiation from the first and second gain media thereby establishing a laser beam in the optical cavity and a control apparatus operable to adjust a property of at least one of the first and second pump beams and thereby control a thermal lens of at least one of the first and second gain media so as to substantially remove an instability zone from the power curve of the laser.

Substantially removing an instability zone from the power curve of the laser advantageously allows the power of a laser beam which is output from the laser to be continuously varied over an increased range of powers without having to cross an instability zone in which the power of the output laser beam becomes unstable.

The control apparatus may be operable to adjust a property of the first and second pump beams and thereby control a thermal lens of at least one of the first and second gain media such that the thermal lens of the first gain medium has a different strength to the thermal lens of the second gain medium.

The control apparatus may be operable to adjust a property of the first and second pump beams and thereby control a thermal lens of at least one of the first and second gain media such that the laser beam is focussed symmetrically in the optical cavity.

The at least one of the end mirrors may comprise a concave mirror.

The optical cavity may be asymmetric about a geometric centre of the optical cavity.

A distance between the first gain medium and the geometric centre of the cavity and a distance between the second gain medium and the geometric centre of the cavity may be different from one another.

The difference between the distance between the first gain medium and the geometric centre of the cavity and the distance between the second gain medium and the geometric centre of the cavity may be less than about 10% of the length of the optical cavity.

The first gain medium and the second gain medium may each be doped with a quantity of dopant and wherein a concentration of dopant in the first gain medium is different to a concentration of dopant in the second gain medium.

The control apparatus may be operable to adjust the power of at least one of the first and second pump beams.

The at least one radiation source may comprise a first radiation source configured to provide the first pump beam and a second radiation source configured to provide the second pump beam. The control apparatus may be operable to adjust the power of at least one of the first and second pump beams provided by the first and second radiation sources.

The first and second pump beams may be linearly polarised and the control apparatus may be operable to adjust the polarisation direction of at least one of the first and second pump beams.

The control apparatus may comprise at least one wave plate operable to adjust the polarisation direction of at least one of the first and second pump beams.

The first and second gain media may comprise crystals having crystal axes wherein the strength of the thermal lenses of the first and second gain media are dependent on the relative alignment of the polarisation directions of the first and second pump beams and the crystal axes of the first and second gain media.

The laser may further comprise a polarising beam splitter configured to receive a main pump radiation beam from the at least one radiation source and split the main pump radiation beam into the first pump radiation beam and the second pump radiation beam, wherein the first pump radiation beam has a first polarisation direction and the second pump radiation beam has a second polarisation direction which is substantially orthogonal to the first polarisation direction.

The at least one radiation source may be configured to provide a main pump radiation beam which is substantially unpolarised and direct the main pump radiation beam to be incident on the polarising beam splitter.

The at least one radiation source may comprise an optical fibre which is configured to direct the main pump radiation beam to be incident on the polarising beam splitter.

The laser may further comprise at least one lens configured to focus at least one of the first and second pump beams into at least one of the first and second gain media The control apparatus may be operable to adjust the focussing of at least one of the first and second pump beams into at least one of the first and second gain media.

The control apparatus may comprise an actuator operable to move the at least one lens.

The first gain medium and the second gain medium may be mounted in a mount. The mount may be configured to conduct heat between the first and second gain media.

Substantially removing an instability zone from the power curve of the laser may allow the power of the laser beam to be substantially continuously varied through the removed instability zone.

According to a second aspect of the invention there is provided a method of producing a laser beam, the method comprising providing an optical cavity with pump radiation comprising a first pump beam and a second pump beam, directing the first pump beam to be incident on a first gain medium positioned in the optical cavity and directing the second pump beam to be incident on a second gain medium positioned in the optical cavity so as to stimulate emission of radiation from the first and second gain media thereby establishing a laser beam in the optical cavity, adjusting a property of at least one of the first and second pump beams and thereby control a thermal lens of at least one of the first and second gain media so as to substantially remove an instability zone from the power curve of the laser.

A property of at least one of the first and second pump beams may be adjusted such that a strength of the thermal lens of the first gain medium is different to a strength of the thermal lens of the second gain medium.

A property of at least one of the first and second pump beams may be adjusted such that the laser beam is focussed symmetrically about a geometric centre of the optical cavity.

Adjusting a property of at least one of the first and second pump beams may comprise adjusting a polarisation direction of at least one of the first and second pump beams.

Adjusting a property of at least one of the first and second pump beams may comprise adjusting the power of at least one of the first and second pump beams.

Adjusting a property of at least one of the first and second pump beams may comprise adjusting a focussing of at least one of the first and second pump beams.

Substantially removing an instability zone from the power curve of the laser may allow the power of the laser beam to be substantially continuously varied through the removed instability zone.

One or more aspects or features described in the preceding or following descriptions may be combined with one or more other aspects or features.

BRIEF DESCRIPTION OF THE DRAWINGS

Embodiments of the invention will now be described, by way of example only, with reference to the accompanying schematic drawings, in which.

DETAILED DESCRIPTION OF THE INVENTION

Figure 1:
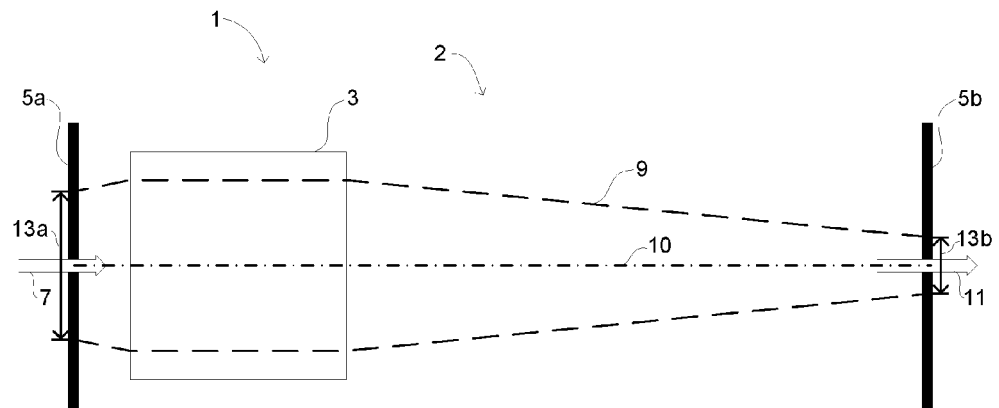
FIG. 1 is a schematic illustration of a laser.

FIG. 1 is a schematic illustration of a laser 1. The laser comprises an optical cavity 2 which is defined by a first end mirror 5a and a second end mirror 5b. A solid state gain medium 3 is positioned between the end mirrors 5a, 5b and in the optical cavity 2. The gain medium 3 is pumped with a pump beam 7. The pump beam 7 may, for example, be a laser beam which is output from one or more diode lasers (not shown). The pump beam 7 is depicted in FIG. 1 as entering the cavity 2 through the first end mirror 5a which may, for example, transmit a substantial portion of the pump beam 7. However the pump beam 7 may enter the cavity 2 by other means. In the example which is shown in FIG. 1 the gain medium 3 is positioned towards the left-hand side of the cavity 2 and close to the first end mirror 5a.

The gain medium 3 may, for example, comprise a crystal or glass containing one or more dopants. The gain medium 3 absorbs energy from the pump beam 7 which serves to excite the gain medium 3 into a state of population inversion. When the gain medium 3 is in a state of population inversion radiation propagating through the gain medium 3 can experience a gain. If this gain is greater than losses experienced in a round trip of the cavity 2 by radiation propagating in the cavity 2 then a laser beam 9 may be established in the cavity 2. The laser beam 9 undergoes successive reflections between the end mirrors 5a, 5b. Upon each pass through the gain medium 3 the laser beam 9 is amplified. One of the end mirrors (e.g. the second end mirror 5b) may be partially transmissive and may transmit a portion of the laser beam 9 so as to form an output laser beam 11.

The cavity 2 has an optical axis 10 which is shown with a dash-dot line in FIG. 1. The optical axis 10 represents the central axis of the laser beam 9 in the cavity 2. The outer extent of the laser beam 9 in the cavity 2 is depicted with dashed lines in FIG. 1. It can be seen from FIG. 1 that the gain medium 3 acts to focus the laser beam 9. Focussing of the laser beam 9 by the gain medium 3 is due to an effect known as thermal lensing. Thermal lensing is caused by the pump beam 7 which serves to heat the gain medium 3. The gain medium 3 is heated to a greater extent along a central axis of the pump beam 7 than in other regions of the gain medium 3. This causes refractive index gradients to be established in the gain medium 3 which serve to focus the laser beam 9 such that the gain medium 3 acts as a lens.

The thermal lens focussing of the laser beam 9 which is shown in FIG. 1 results in the laser beam 9 being contained within the cavity 2 such that it continues to be successively reflected between the end mirrors 5a, 5b. Additionally or alternatively the one or both of the end mirrors 5a, 5b may be a concave mirror which may cause the laser beam 9 to be focussed such that it remains within the cavity 2. The laser beam 9 has a first beam diameter 13a at the first end mirror 5a and a second beam diameter 13b at the second end mirror 5b. In the arrangement which is shown in FIG. 1 the first and second beam diameters 13a, 13b at the first and second end mirrors 5a, 5b are finite. The thermal lens of the gain medium 3 which is shown in FIG. 1 therefore leads to a stable mode of operation of the laser 1. In general a stable mode of operation may be considered to be any mode in which a ray of the laser beam 9 may undergo many successive reflections between the end mirrors 5a, 5b whilst remaining at a finite (but not necessarily constant) distance from the optical axis 10 of the cavity 2. For ease of illustration the pump beam 7 is shown in the figures as having a smaller cross-section than the laser beam 9 in the cavity 2. However in practice the cross-section of the pump beam 7 in the cavity 2 may be larger than the cross-section of the laser beam 9, may be approximately the same as the cross-section of the laser beam 9 or may be smaller than the cross-section of the laser beam 9.

In some applications of the laser 1 it may be desirable to increase the power of the output laser beam 11. This may be achieved by increasing the power of the pump beam 7. Increasing the power of the pump beam 7 serves to increase the amplification of the laser beam 9 which occurs in the gain medium 3 and therefore increases the power of the laser beam 9 and the output laser beam 11. However, increasing the power of the pump beam 7 also serves to increase the strength of the thermal lens of the gain medium 3. An increase in the strength of the thermal lens of the gain medium causes a change in the first and second beam diameters 13a, 13b at the first and second end mirrors 5a, 5b. As will be described below with reference to FIG. 2 changes in the first and second beam diameters 13a, 13b at the first and second end mirrors 5a, 5b may cause the laser to enter an unstable mode of operation.

Figure 2:
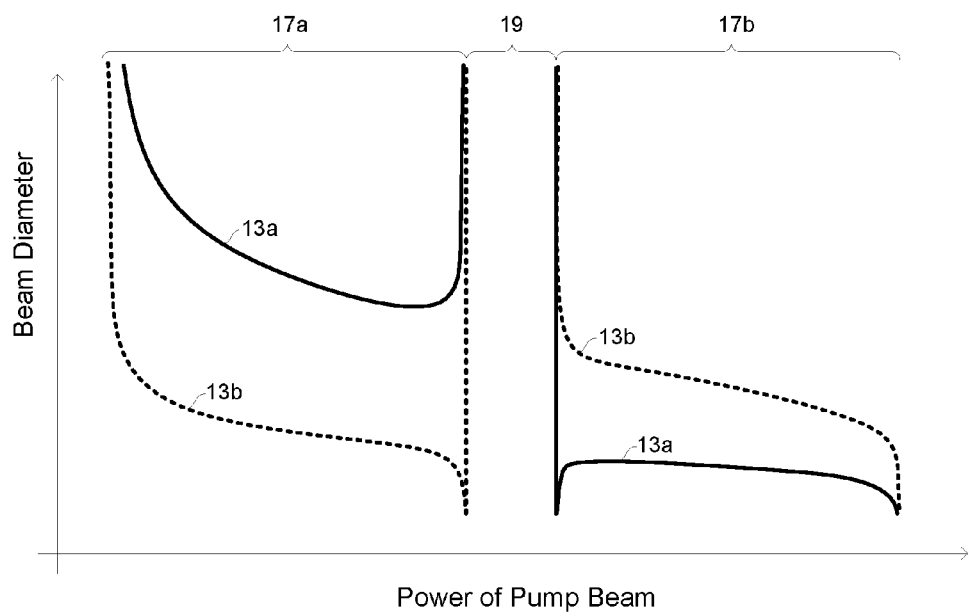
FIG. 2 is a schematic representation of the diameter of a laser beam at different positions in the laser of FIG. 1 for a range of pumping powers.

FIG. 2 is a schematic representation of the first and second beam diameters 13a, 13b at the first and second end mirrors 5a, 5b as a function of the power of the pump beam 7. The beam diameters which are shown in FIG. 2 are the beam diameters of a fundamental transverse mode $TEM_{00}$ of the laser beam 9. The first beam diameter 13a at the first end mirror 5a is depicted with a solid line and the second beam diameter 13b at the second end mirror 5b is depicted with a dotted line.

In the arrangement of the laser 1 which is shown in FIG. 1 in which the gain medium 3 is positioned towards the first end mirror 3a, the first beam diameter 13a at the first end mirror 5a is greater than the second beam diameter 13b at the second end mirror 5b at low pump powers. As the power of the pump beam 7 increases, the strength of the thermal lens of the gain medium 3 also increases. As can be seen in FIG. 2 an increase in the strength of the thermal lens of the gain medium 3 initially causes a decrease in both the first beam diameter 13a and the second beam diameter 13b. The range of powers of the pump beam 7 in which the laser beam 9 remains stable (and the beam diameters 13a, 13b are finite) may be referred to as a first stability zone 17a as is labelled in FIG. 2.

As the power of the pump beam 7 and thus the strength of the thermal lens of the gain medium 3 is further increased the laser 1 enters an unstable mode of operation in which the beam diameters 13a, 13b at the first and second end mirrors 5a, 5b are non-finite. This can be seen in FIG. 2 as the first beam diameter 13a approaches infinity and the second beam diameter goes to a minimum. The range of powers of the pump beam 7 in which the laser beam 9 is unstable (and the beam diameters 13a, 13b are non-finite) may be referred to as an instability zone 19 as is labelled in FIG. 2.

As the power of the pump beam 7 is further increased in the instability zone 19, the strength of the thermal lens of the gain medium 3 is also further increased. The thermal lens of the gain medium 3 may become strong enough that the laser beam 9 is again focussed such that the beam diameters 13a, 13b at the first and second end mirrors 5a, 5b are finite and the laser 1 transitions to a second stable mode of operation. This can be seen in FIG. 2 as the beam diameters 13a, 13b return to finite values in a second stability zone 17b.

Further increases in the power of the pump beam 7 in the second stability zone 17b cause the strength of the thermal lens to continue to increase such that the first beam diameter 13a at the first end mirror 5a decreases. As the first beam diameter 13a at the first end mirror 5a decreases with increasing power of the pump beam 7, radiation from the laser beam 9 may again be lost from the cavity such that the laser 1 transitions to another instability zone.

As was described above when the power of the pump beam 7 is in an instability zone radiation from the laser beam 9 is lost from the cavity 2. Loss of laser radiation from the cavity 2 causes a reduction in the power of the output laser beam 11. Transitioning from the first stability zone 17a to the instability zone 19 by increasing the power of the pump beam 7 therefore causes a reduction in the power of the output laser beam 11 despite an increase in the power of the pump beam 7. This effect may be referred to as a "roll-over" in a graph of the power of the output laser beam 11 as a function of the power of the pump beam 7 (which is generally known as the power curve of the laser) of the laser 1. An instability zone 19 may be referred to an instability zone of the power curve of the laser. The roll-over generally occurs at a point at which the gradient of the power of the output laser beam 11 to the power of the pump beam 7 reduces to zero and then becomes negative.

Additionally or alternatively an instability zone 19 may cause the laser to operate with multiple spatial modes. For example, a mode profile of the laser beam 9 may depart from a fundamental spatial mode $TEM_{00}$, which may be undesirable in some applications.

The effect of the instability zone 19 which separates the first and second stability zones 17a, 17b is that in order to transition from the first stability zone 17a to the second stability zone 17b so as to increase the power of the output laser beam 11 an instability zone 19 must be crossed. That is the power of the pump beam 7 must be increased through a range of powers in the instability zone 19 which initially cause a decrease in the power of the output laser beam 11 before the second stability zone 17b is reached and the power of the output laser beam 11 once again increases with increases in the power of the pump beam 7. The power of the output laser beam 11 cannot therefore be continuously varied between powers in the first stability zone 17a and powers in the second stability zone 17b without experiencing significant variations or instabilities in the spatial mode of the laser beam 9.

In some applications of a laser 1 it may be desirable to continuously vary the power of the output laser beam 11 over a large range of powers without having to cross an instability zone in which the power of the output laser beam 11 becomes unstable. It is therefore advantageous to reduce the size of (or substantially remove) an instability zone 19 which separates two stability zones 17a, 17b such that the power of the output laser beam 11 may be increased from a first stability zone 17a to a second stability zone 17b without having to cross an instability zone 19 which causes a reduction in the power of the output laser beam 11.

Figure 3:
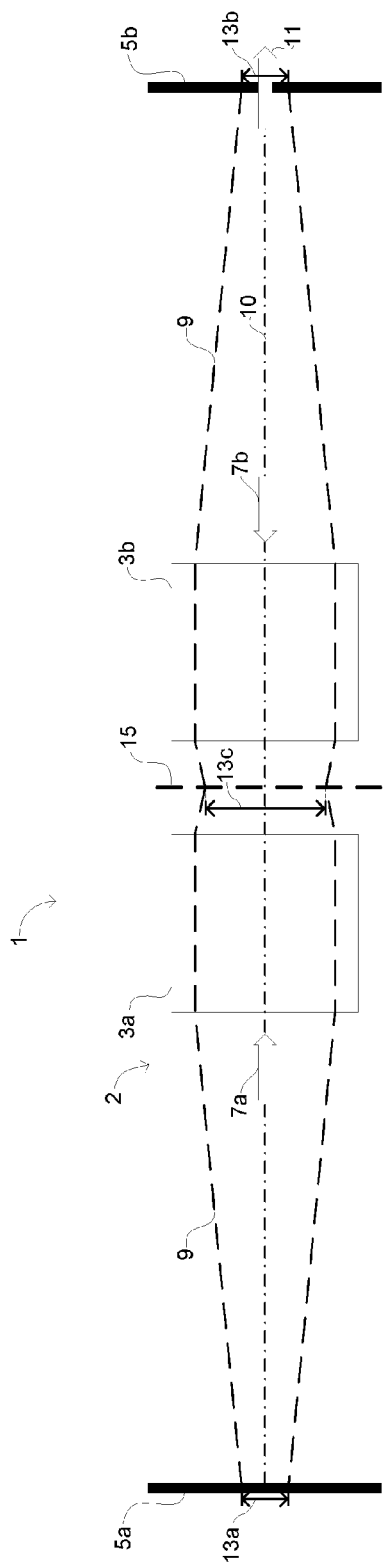
FIG. 3 is schematic illustration of an embodiment of a laser.

FIG. 3 is a schematic depiction of a laser 1 which may be operated so as to reduce or substantially remove an instability zone which separates two stability zones 17a, 17b. The laser 1 which is shown in FIG. 3 may be considered to be an unfolded version of the laser 1 which is shown in FIG. 1 with the laser 1 being unfolded about the first end mirror 5a which is shown in FIG. 1. The laser 1 comprises a first gain medium 3a and a second gain medium 3b positioned in a cavity 2 which is defined by a first end mirror 5a and a second end mirror 5b. The first gain medium 3a is pumped by a first pump beam 7a and the second gain medium 3b is pumped by a second pump beam 7b. The first pump beam 7a and/or the second pump beam 7b may, for example, be laser beams which are output from one or more diode lasers (not shown). The first and second pump beams 7a, 7b are merely shown schematically in FIG. 2. In general the first and second pump beams 7a, 7b propagate substantially along an optical axis 10 of the cavity 2. Practical implementations of the laser 1 which allow for easy entry of the pump beams 7a, 7b into the cavity 2 will be described further below. Pumping the first and second gain media 3a, 3b with the first and second pump beams 7a, 7b may result in the emission of a laser beam 9. The second end mirror 5b is partially transmissive and transmits a portion of the laser beam so as to form an output laser beam 11.

Positioning two gain media 3a, 3b in the cavity 2 (as opposed to one gain medium 3 in the laser 1 of FIG. 1) allows a given amount of pump power to be spread between the two gain media 3a, 3b. For a given combined power of the pump beams 7a, 7b the amount of power which is absorbed by each gain medium 3a, 3b is therefore reduced. A reduced amount of pump power which is absorbed by each gain medium 3a, 3b means that the strength of the thermal lens of each gain medium 3a, 3b is reduced.

In the embodiment which is shown in FIG. 3 the first and second gain media 3a, 3b are substantially the same as each other and are positioned equidistant from the geometric centre 15 of the cavity 2. The pump beams 7a, 7b may be substantially the same such that the strength of the thermal lenses of the first and second gain media 3a, 3b are substantially the same. If the thermal lens of the first gain medium 3a is substantially the same as the thermal lens of the second gain medium 3b then the focussing of the laser beam 9 in the cavity 2 is symmetrical about the geometric centre 15 of the cavity 2. Symmetric focussing of the laser beam 9 leads to the laser beam 9 having a first beam diameter 13a on the first end mirror 5a which is substantially the same as a second beam diameter 13b of the laser beam 9 on the second end mirror 13b.

Figure 4:
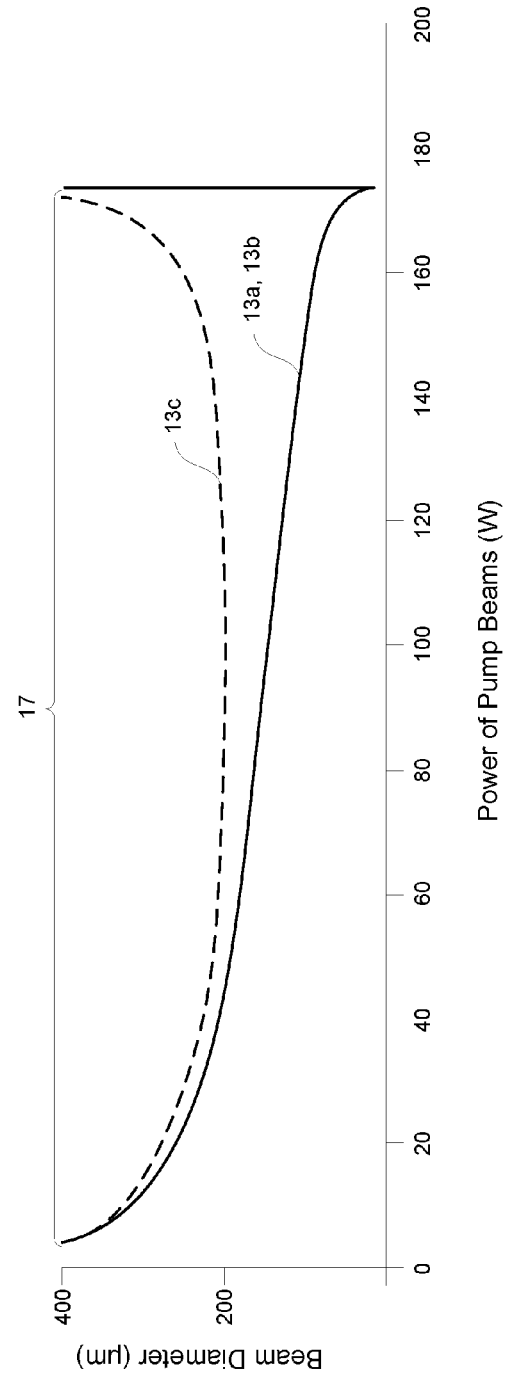
FIG. 4 is a schematic representation of the diameter of a laser beam at different positions in the laser of FIG. 3 for a range of pumping powers.

FIG. 4 is a schematic representation of the first and second beam diameters 13a, 13b at the first and second end mirrors 5a, 5b of the laser 1 of FIG. 3 as a function of the combined power of the first and second pump beams 7a, 7b. The beam diameters which are shown in FIG. 4 are the beam diameters of a fundamental transverse mode $TEM_{00}$ of the laser beam 9. The power of the first and second pump beams 7a, 7b are the same and are each half of the combined power of the two pump beams 7a, 7b. In the case of symmetric focussing which was described above with reference to FIG. 3, the first and second beam diameters 13a, 13b are the same and are shown in FIG. 4 with a solid line. Also shown in FIG. 4 is the beam diameter 13c of the laser beam 9 at the geometric centre 15 of the cavity 2 (dashed line). It can be seen from FIG. 4 that the symmetry of focussing of the laser beam 9 leads to a single stability zone 17 in which the beam diameters 13a-13c are finite. As the power of the pump beams 7a, 7b are increased through the stability zone 17 the beam diameters 13a, 13b at the first and second end mirrors 5a, 5b continuously decrease before reaching a minimum and then rapidly approaching infinity at the upper end of the stability zone 17. The beam diameter 13c at the geometric centre 15 of the cavity 2 initially decreases with increasing pump beam power before increasing again and going to infinity at the upper end of the stability zone 17.

FIG. 4 shows a range of powers of the pump beams 7a, 7b in which there is a single stability zone 17. At pump powers greater than those shown in FIG. 4 it may be possible to reach a further stability zone in which the beam diameter 13c at the geometric centre 15 of the cavity 2 decreases before tending to a minimum. Depending on the arrangement of the gain media 3a, 3b in the cavity 2 this stability zone may only be reached at very high powers of the pump beams 7a, 7b which may be impractical to reach. For example, it may be impractical to increase the powers of the pump beams 7a, 7b in order to reach a further stability zone due to a thermal fracture limit of crystals used for the gain media 3a, 3b, aberrations in the thermals lenses at high powers of the pump beams 7a, 7b, and non-linear behaviour of the gain media 3a, 3b.

For some positions of the gain media 3a, 3b in the cavity 2 it may be possible to reach still further stability zones. For example, in an embodiment in which the gain media 3a, 3b are positioned approximately a quarter of the way along the length of the cavity 2 and approximately three quarters of the way along the length of the cavity 2 then there may be four stability zones.

It will be appreciated from FIG. 4 that arranging a laser 1 such that a laser beam 9 is focussed symmetrically about the geometric centre 15 of the cavity 2 allows the power of the pump beams 7a, 7b to be increased over a large range of powers in the stability zone 17 without causing the laser 1 to enter an instability zone. The power of the pump beams 7a, 7b may be increased throughout the stability zone 17 in order to continuously increase the power of the output laser beam 11.

As was described above arranging a cavity 2 such that it is symmetric about the geometric centre 15 of the cavity 2 results in a single longer stability zone 17, thereby increasing a range of pump beam 7a, 7b powers and laser beam 9 powers which may be used whilst the laser beam 9 remains stable in the cavity 2. References to symmetry in the cavity 2 should be understood to refer to symmetrical focussing of the laser beam 9 in the cavity 2, since it is the focussing symmetry which causes the first and second beam diameters 13a, 13b to be the same and which causes the laser beam 9 to remain stable.

In practice perfect focussing symmetry in the cavity 2 may be difficult or impossible to achieve. For example, effects such as differences in dopant concentrations in the gain media 3a, 3b, differences in the distance between each gain media 3a, 3b and the geometric centre 15 of the cavity 2, differences in the power of the pump beams 7a, 7b and/or differences in the shape of the end mirrors 5a, 5b may break the symmetry in the cavity 2 and may cause an instability zone which may separate the stability zone 17 into two parts.

It may be desirable to deliberately introduce asymmetry into the cavity 2. For example, it can be seen from FIG. 4 that whilst the laser beam 9 is stable across a large range of pump beam powers in the stability zone 17, at low pump beam powers the laser beam 9 is unstable. In some applications it may be desirable for the laser beam 9 to be stable at low pump beam powers. For example, it may be desirable to align components of the cavity 2 whilst a laser beam 9 having a low power propagates in the cavity 2. It may therefore be desirable for a laser beam 9 to be stable at low pump beam powers and hence low laser beam powers. This may, for example, be achieved if at least one of the end mirrors 5a, 5b is a concave mirror which acts to focus the laser beam 9 in the cavity 2.

Figure 5:
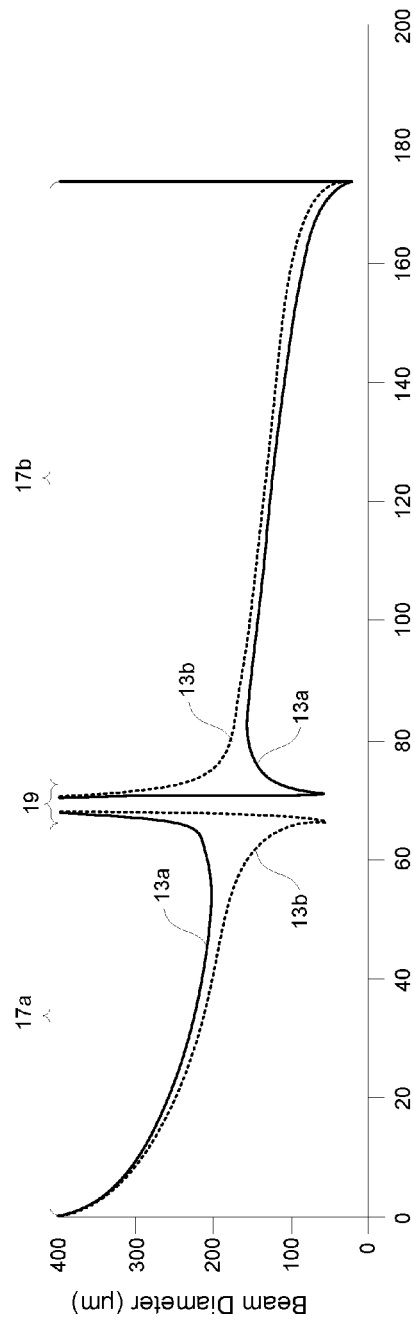
FIG. 5 is an alternative schematic representation of the diameter of a laser beam at different positions in the laser of FIG. 3.

FIG. 5 is a schematic representation of the first beam diameter 13a (solid line) at the first end mirror 5a and the second beam diameter 13b (dotted line) for an embodiment in which the first end mirror 5a is a concave mirror with a radius of curvature of approximately 2 meters. The beam diameters which are shown in FIG. 5 are the beam diameters of a fundamental transverse mode $TEM_{00}$ of the laser beam 9. It can be seen from FIG. 5 that the use of a concave first end mirror 5a causes the laser beam 9 to be stable at low powers of the pump beams 7a, 7b and may therefore allow the cavity 2 to be aligned at low powers of the laser beam 9. However it will be appreciated that the introduction of a concave mirror which focusses the laser beam 9 on one side of the cavity 2 but not on the other side of the cavity 2 serves to break the focussing symmetry in the cavity. Breaking the focussing symmetry in the cavity 2 causes an instability zone 19 to occur which separates the stability zone into a first instability zone 17a and a second instability zone 17b. As was described above with reference to FIGS. 1 and 2 the presence of an instability zone 19 which separates a first and second stability zone is undesirable since it causes a reduction in the power of the output laser beam 11 as the power of the pump beams are increased through the instability zone 19. It is therefore desirable to configure a laser 1 so as to substantially remove the instability zone 19.

Figure 6:
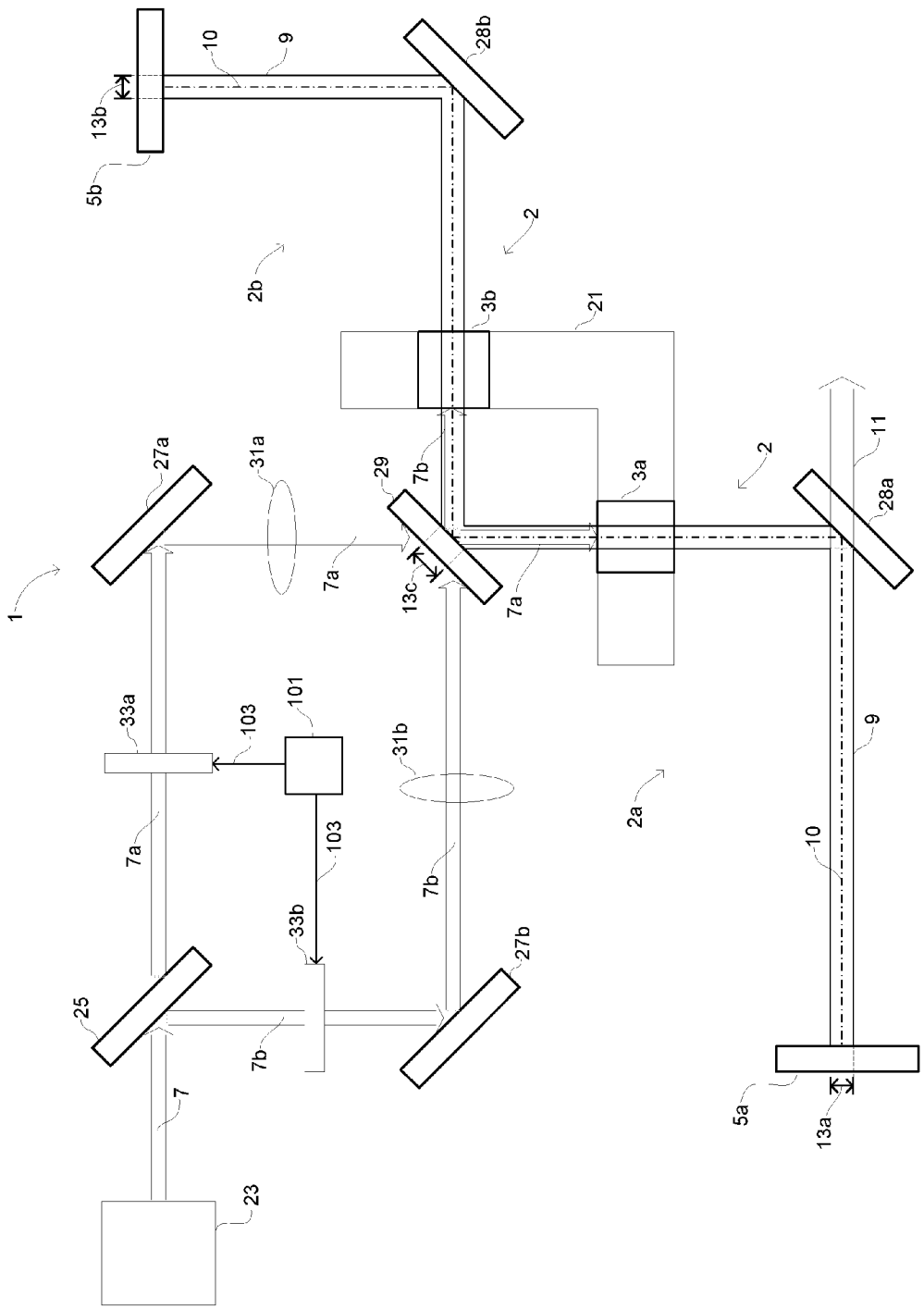
FIG. 6 is a schematic illustration of an alternative embodiment of a laser.

FIG. 6 is a schematic depiction of a laser 1 which may be operated such that the instability zone 19 is substantially removed. The laser 1 comprises a first end mirror 5a and a second end mirror 5b which define an optical cavity 2. The optical cavity 2 comprises a first arm 2a and a second arm 2b which extend either side of a central mirror 29. The first arm 2a includes a mirror 28a and the second arm 2b includes a mirror 28b. An optical cavity 2 of the type shown in FIG. 6 may, for example, be referred to as a folded cavity. The optical cavity 2 has an optical axis 10 which extends between the first and second end mirrors 5a, 5b via the mirrors 28a, 28b and the central mirror 29. A first gain medium 3a is positioned in the first arm 2a of the cavity and a second gain medium 3b is positioned in the second arm 2b of the cavity 2. The first and second gain media 3a, 3b are held by a mount 21. The mount 21 may, for example, have a high thermal conductivity and may conduct heat between the first and second gain media 3a, 3b. For example, the mount 21 may comprise copper or another material with a high thermal conductivity. This may serve to regulate the temperature of the first and second gain media 3a, 3b and may in particular cause the first and second gain media 3a, 3b to have substantially the same temperature as each other. The strength of the thermal lenses of the gain media 3a, 3b may at least partially depend on the temperature of the gain media 3a, 3b. Regulating the temperatures of the first and second gain media such that they have substantially the same temperature may improve the predictability of the thermal lenses of the gain media 3a, 3b and may make it easier to cause symmetric focussing of the laser beam 9 in the cavity 2.

A radiation source 23 is configured to provide a pump beam 7. The radiation source 23 may, for example, comprise one or more diode lasers. The pump beam 7 is directed to a polarising beam splitter 25. The pump beam 7 which is incident on the polarising beam splitter 25 may comprise unpolarised radiation. For example, the pump beam 7 may be transported from the radiation source 23 to be incident on the polarising beam splitter 25 via an optical fibre (not shown). Transporting the pump beam 7 via an optical fibre may advantageously condition the pump beam 7 such that the pump beam 7 which is output from the optical fibre has a substantially circular cross-section. Additionally, transporting the pump beam 7 via an optical fibre may allow the radiation source 23 to be positioned away from the cavity 2 of the laser 1 which may advantageously prevent heat which is generated by the radiation source from being transferred to the cavity 2 and from heating components of the cavity 2. An optical fibre may act to depolarise radiation which propagates through it and as such the pump beam 7 which is directed to be incident on the polarising beam splitter 25 may be unpolarised. The polarising beam splitter 25 is configured to transmit a component of the pump beam 7 having a first linear polarisation state and reflect a component of the pump beam 7 having a second linear polarisation state which is orthogonal to the first linear polarisation state. A first pump beam 7a having the first polarisation state is therefore substantially transmitted by the polarising beam splitter 25 and a second pump beam 7b having the second polarisation state is substantially reflected by the polarising beam splitter 25. If the pump beam 7 which is incident on the polarising beam splitter is completely unpolarised then the pump beam is split equally into the first and second pump beams 7a, 7b such that each of the first and second pump beams 7a, 7b have a power which is approximately half of the power of the pump beam 7 which is incident on the polarising beam splitter 25.

In some embodiments the pump beam 7 which is incident on the polarising beam splitter 25 is not completely unpolarised and may, for example, have some degree of linear polarisation. If a pump beam 7 having a degree of polarisation is incident on the polarising beam splitter 25 then the first and second pump beams 7a, 7b may have different powers. In some embodiments it may be desirable for the first and second pump beams 7a, 7b to have substantially the same power. In such embodiments the polarisation state of the pump beam 7 which is incident on the partial polariser 25 may be adjusted (e.g. using a wave plate). Additionally or alternatively the pump beam 7 may be passed through a birefringent material prior to being incident on the polarising beam splitter 25. The birefringent material may depolarise the pump beam 7 or change its polarisation in some way such that the pump beam 7 which is incident on the polarising beam splitter 25 is substantially or partially unpolarised.

The first and second pump beams 7a, 7b are directed via respective mirrors 27a, 27b to be incident on the central mirror 29. The first pump beam 7a may, for example, be focussed by a first lens 31a as is shown in FIG. 6. The second pump beam 7b may be focussed by a second lens 31b as is shown in FIG. 6. The central mirror 29 transmits the first and second pump beams 7a, 7b into the cavity 2 such that they are incident on the first and second gain media 3a, 3b respectively. The gain media 3a, 3b absorb energy from the pump beams 7a, 7b which causes the gain media 3a, 3b to be excited into a state of population inversion thereby allowing for emission of a laser beam 9. The laser beam 9 undergoes successive reflections between the end mirrors 5a, 5b via the mirrors 28a, 28b and the central mirror 29 which reflects the laser beam 9 between the first and second arms 2a, 2b of the cavity 2. The reflectivity of the central mirror 29 may be a function of wavelength such that radiation having the wavelength of the first and second pump beams 7a, 7b is transmitted by the central mirror 29, whereas radiation having the wavelength of the laser beam 9 is substantially reflected by the central mirror 29. The laser beam 9 is amplified as it passes through the gain media 3a, 3b. The mirror 28a is partially transmissive and transmits a portion of the laser beam 9 so as to form an output laser beam 11. In other embodiments a different mirror of the cavity 2 may be partially transmissive so as to transmit a portion of the laser beam 9 to form an output laser beam 11.

The laser beam 9 has a first beam diameter 13a at the first end mirror 5a, a second beam diameter 13b at the second end mirror 5b and a beam diameter 13c at the mirror 29. For ease of illustration the laser beam 9 is depicted in FIG. 6 as having a uniform diameter throughout the cavity 2. However it will be appreciated that the beam diameter of the laser beam 9 will vary along the cavity 2 due to focussing of the laser beam 9 in the cavity 2.

The cavity 2 may be arranged such that it is approximately symmetrical about the central mirror 29. However as was described above even if the cavity 2 is intended to be symmetrical small differences between the first and second arms 2a, 2b may break the symmetry and may cause the cavity to be asymmetrical. In some embodiments the cavity may be intentionally asymmetric about a geometric centre of the cavity. For example, one of the end mirrors 5a, 5b may be a concave mirror and the other end mirror 5a, 5b may be a plane mirror. Alternatively both of the end mirrors 5a, 5b may be concave mirrors but may have different radii of curvature.

As was explained above with reference to FIGS. 4 and 5 asymmetry in the cavity 2 whether intentional or otherwise may cause the laser beam 9 to become unstable at some powers of the pump beam 7 which may be referred to as an instability zone. According to an embodiment of the invention an instability zone may be reduced or substantially removed by adjusting a property of at least one of the first and second pump beams 7a, 7b so as to independently control the thermal lenses of the first and/or the second gain media 3a, 3b.

In the embodiment which is depicted in FIG. 6 the first pump beam 7a passes through a first wave plate 33a before being incident on the first gain medium 3a and the second pump beam 7b passes through a second wave plate 33b before being incident on the second gain medium 3b. The first wave plate 33a and the second wave plate 33b are configured to adjust the polarisation states of the first and second pump beams 7a, 7b respectively. For example the first wave plate 33a and/or the second wave plate 33b may be configured to rotate the linear polarisation states of the first and second pump beams 7a, 7b.

The first and/or the second gain media 3a, 3b may comprise crystals which are doped with one or more dopants. The crystalline structure of a gain medium 3a, 3b defines axes of the crystal which may, for example, be referred to as an a-axis, a b-axis and a c-axis. The different axes of a crystal may have refractive indices, absorption properties and other optical properties which are different to each other. For example a crystal may be a uniaxial crystal in which the refractive index of one of the crystal axes is different to the refractive indices of the other two crystal axes. In an embodiment the first and second gain media 3a, 3b may be an Nd:YVO$_4$ crystal which is a uniaxial crystal. Alternatively a crystal may be a biaxial crystal in which the refractive index, absorption properties and/or other optical properties of each of the crystal axes are different from each other. In a uniaxial crystal or a biaxial crystal the absorption coefficient of the crystal may depend on the relative alignment between the polarisation direction of radiation incident on the crystal and the different crystal axes. For example, in a uniaxial or biaxial crystal radiation whose polarisation direction is parallel with one axis of the crystal will experience a larger absorption coefficient than radiation whose polarisation direction is parallel with either of the other two axes of the crystal or vice versa. The absorption coefficient affects the amount of pump radiation which is absorbed by the crystal and the location within the crystal at which the pump radiation is absorbed, which in turn affects the strength of the thermal lens in the crystal that results from absorption of pump radiation. For example, pumping a crystal with a pump beam which has a given power and a polarisation direction which is orientated with the a first axis of the crystal may cause a stronger thermal lens than pumping a crystal with a pump beam of the same given power but with a polarisation direction which is orientated perpendicular to the first axis of the crystal. The strength of a thermal lens in a crystal may therefore be adjusted by adjusting the relative orientation of the polarisation direction of a pump beam and the axes of the crystal.

In the laser 1 which is depicted in FIG. 6 the polarising beam splitter 25 creates a first pump beam 7a which has a first linear polarisation state and a second pump beam 7b which has a second linear polarisation state which is orthogonal to the first linear polarisation state. The polarising beam splitter 25 therefore creates two linearly polarised pump beams which may have substantially the same power (e.g. if the pump beam 7 which is incident on the polarising beam splitter 25 is unpolarised). The orientation of the polarisation direction of the first and second pump beams 7a, 7b may be adjusted relative to crystal axes of the first and second gain media 3a, 3b in order to independently control the thermal lenses of the first and second gain media 3a, 3b. For example, the first and/or the second wave plates 33a, 33b may be used to rotate the polarisation states of the first and second pump beams 7a, 7b such that the polarisation states of the first and second pump beams 7a, 7b have a desired orientation relative to crystal axes of the first and second gain media 3a, 3b in order to create a desired thermal lens in each of the gain media 3a, 3b. The thermal lenses of the first and/or the second gain media 3a, 3b may be independently controlled in order to reduce or substantially remove an instability zone of the power curve of the laser 1. In particular the thermal lenses of the first and/or the second gain media 3a, 3b may be independently controlled in order to vary a range of powers of the pump beam 7 at which the laser beam 9 is stable in the cavity 2. For example, a range of powers of the pump beam 7 at which the laser beam 9 is stable may be increased by independently controlling the thermal lenses of the first and/or the second gain media 3a, 3b.

In some embodiments the pump beam 7 which is incident on the polarising beam splitter may not be unpolarised and may, for example, have a component which is linearly polarised. In such embodiments the amount of radiation which forms the first and second pump beams 7a, 7b at the polarising beam splitter 25 will depend on the relative orientation of the polarised component of the pump beam 7 and the polarising beam splitter 25 and the magnitude of the polarised component. The orientation and/or the magnitude of the polarised component of the pump beam 7 may, for example, be controlled by positioning a polariser and/or a half-wave plate upstream of the polarising beam splitter 25. The polariser and/or the half-wave plate may be controlled in order to control the relative powers of the first and second pump beams 7a, 7b.

In an embodiment the first end mirror 5a may be a concave mirror and the second end mirror 5b may be a plane mirror. For example, the first end mirror 5a may have a radius of curvature of approximately 2 meters. The first end mirror 5a therefore focusses the laser beam 9 and causes the focussing of the laser beam 9 in the optical cavity to be asymmetric. As was described above this may advantageously allow the laser beam 9 to be stable at low powers of the pump beam 7 but if the focussing of the laser beam 9 remains asymmetric at higher powers of the pump beam 7 then an instability zone will occur. In order to reduce or substantially remove the instability zone the thermal lenses of the first and second gain media 3a, 3b may be controlled such that the strength of the thermal lenses are different from each other. For example, the strength of the thermal lenses may be controlled so as to correct for the focussing of the laser beam 9 by the first end mirror 5a and restore symmetrical focussing of the laser beam 9 in the optical cavity 2.

Figure 7:
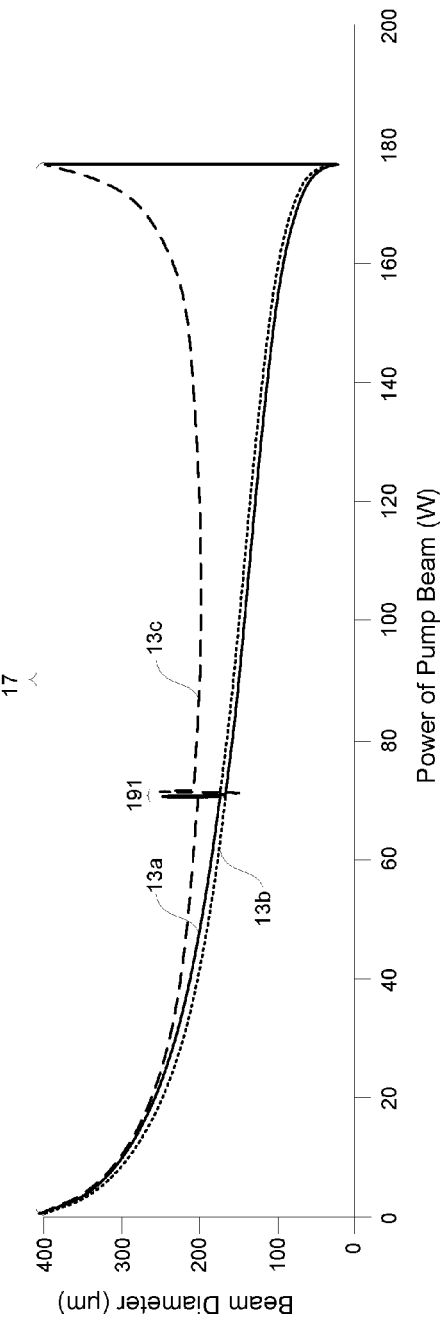
FIG. 7 is a schematic representation of the diameter of a laser beam at different positions in the laser of FIG. 6.

FIG. 7 is a schematic representation of the beam diameters of the laser beam 9 at the first end mirror 5a (solid line labelled 13a), at the second end mirror 5b (dotted line labelled 13b) and at the central mirror 29 (dashed line labelled 13c) as a function of the power of the pump beam 7 for the laser 1 of FIG. 6 when the thermal lenses of the gain media are independently controlled so as to substantially remove an instability zone from the power curve of the laser 1. The beam diameters which are shown in FIG. 7 are the beam diameters of a fundamental transverse mode $TEM_{00}$ of the laser beam 9. The beam diameters 13a-13c which are shown in FIG. 7 represent an embodiment in which the first end mirror 5a is a concave mirror having a radius of curvature of approximately 2 meters and the second end mirror 5b is a plane mirror. In order to counteract the asymmetry which is introduced to the cavity 2 by the concave first end mirror 5a, the polarisation directions of the first and second pump beams 7a, 7b are adjusted relative to crystal axes in the first and second gain media 3a, 3b such that the strength of the thermal lenses of the first and second gain media are different from one another.

The first wave plate 33a is configured to orientate the first linear polarisation direction of the first pump beam 7a such that it is parallel with an a-axis of a crystal which forms the first gain medium 3a. In an embodiment the second wave plate 33b may be configured to orientate the second linear polarisation direction of the second pump beam 7b such that it is orientated at an angle of between 0° and 90° with respect to an a-axis of a crystal which forms the second gain medium 3b. The second pump 7b which is incident on the second gain medium 3b therefore includes a component whose polarisation direction is parallel with a c-axis of the crystal of the crystal which forms the second gain medium 3b. The orientations of the first and second polarisation directions of the first and second pump beams 7a, 7b relative to crystal axes of the first and second gain media 3a, 3b are such that the average absorption coefficient experienced by the second pump beam 7b in the second gain medium 3b may be greater than the average absorption coefficient experienced by the first pump beam 7a in the first gain medium 3a. This causes the thermal lens of the second gain medium 3b to be stronger than the thermal lens of the first gain medium 3a.

The greater strength of the thermal lens of the second gain medium 3b compared to the thermal lens of the first gain medium 3a causes a focussing of the laser beam 9 in the second arm 2b of the cavity 2a which substantially balances the focussing of the laser beam 9 by the concave first end mirror 5a in the first arm 2a of the cavity 2. This causes the focussing of the laser beam 9 in the cavity 2 to be substantially symmetric about the central mirror 29 for a pump power that may otherwise lead to unstable operation of the laser. The substantially symmetric focussing of the laser beam 9 can be seen in FIG. 7 which shows that the first beam diameter 13a at the first end mirror 5a is substantially the same as the second beam diameter 13b at the second end mirror 5b across the range of powers of the pump beam 7 which are shown in FIG. 7. The substantially symmetric focussing of the laser beam 9 also results in the laser beam 9 being substantially stable throughout a stability zone 17. It will be appreciated, for example by comparison of FIG. 7 with FIG. 5 that by controlling the thermal lenses in the first and second gain media 3a, 3b so as to bring about symmetrical focussing of the laser beam 9 in the cavity 2 that the instability zone 19 which is seen in FIG. 5 has been substantially removed in FIG. 7. The range of powers of the pump beam 7 at which the laser beam 9 is unstable has therefore been reduced by controlling the thermal lenses in the first and second gain media 3a, 3b.

It can be seen in FIG. 7 that the beam diameters 13a-13c vary continuously with the power of the pump beam 7 throughout the stability zone 17 except in a small range of powers of the pump beam 7 when spikes in the beam diameters 13a-13c occur. This range of powers of the pump beam 7 is labelled in FIG. 7 as a fluctuation region 191. It will however be appreciated that the range of powers of the pump beam 7 in the fluctuation region 191 shown in FIG. 7 is significantly reduced when compared to the range of powers of the pump beam 7 in the instability zone 19 which is shown in FIG. 5. Whilst a fluctuation region 191 occurs as is shown in FIG. 7, the thermal lenses of the gain media 3a, 3b are controlled so as to substantially remove the instability zone 19 from the power curve of the laser 1. The fluctuation region 191 which is shown in FIG. 7 may, for example, be caused by small differences in the focussing of the laser beam 9 in the first and second arms 2a, 2b of the cavity 2.

Controlling the thermal lenses of the gain media 3a, 3b as was described above so as to substantially remove an instability zone 19 may allow the power of the pump beam 7 to be increased through the stability zone 17 without passing through a substantial instability zone. This may advantageously allow the power of the laser beam 9 to be continuously increased in the stability zone 17 without the power of the laser beam 9 decreasing due to passing through an instability zone.

Figure 8:
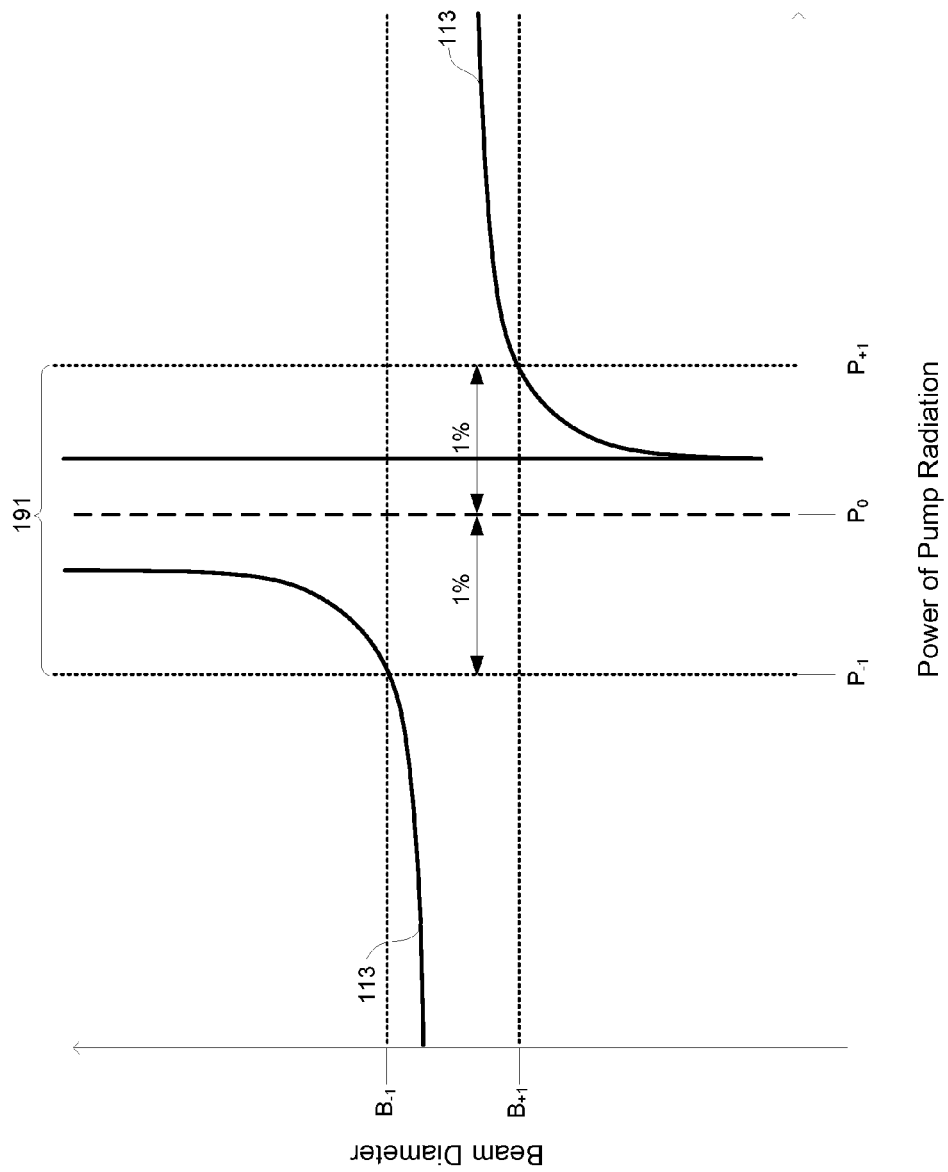
FIG. 8 is a schematic representation of the diameter of a laser beam as a function of a power of pump radiation which is provided to a laser in the vicinity of a fluctuation region.

As has been explained above with reference to FIG. 7, whilst it is desirable to completely remove an instability zone 19 in practice this may be difficult or impossible to achieve. However thermal lenses in gain media in a laser may be controlled so as to substantially remove an instability zone 19. A meaning which may attributed to the term "substantially removing" an instability zone or unstable zone will now be explained with reference to FIG. 8. FIG. 8 is a schematic representation of the diameter of a laser beam as a function of a power of pump radiation which is provided to the laser in the vicinity of a fluctuation region 191. The beam diameter 113 which is depicted in FIG. 8 is the diameter of a fundamental transverse mode $TEM_{00}$. The beam diameter 113 which is depicted in FIG. 8 may, for example, be the beam diameter of the laser beam on an end mirror of the laser cavity. Alternatively the beam diameter 113 may be the beam diameter of the laser beam elsewhere in the laser cavity.

As can be seen in FIG. 8, as the power of pump radiation is increased the beam diameter 113 tends to infinity as it approaches a pump power $P_0$, where $P_0$ is the pump power at the centre of the fluctuation region 191. Whilst in theory the beam diameter 113 tends to infinity in the fluctuation region 191 as is shown in FIG. 8, in practice the beam diameter 113 is limited by the clear aperture of the optical components in the laser cavity and the size of the mirrors in the cavity. Additionally in some embodiments one or more plates may be positioned in the cavity in which one or more apertures are formed so as to further limit the beam diameter of the laser beam 9. In practical implementations the beam diameter 113 will therefore be reach a diameter at which it can no longer increase towards infinity. Depicted in FIG. 8 are pump powers $P_{-1}$ and $P_{+1}$, where $P_{-1}$ is equal to $P_0$ minus 1% of $P_0$ and $P_{+1}$ is equal to $P_0$ plus 1% of $P_0$. In order to determine whether or not an instability zone or an unstable zone has been "substantially removed" the beam diameter $B_{-1}$ at the pump power $P_{-1}$ may be compared to the beam diameter $B_{-1}$ at the pump power $P_{+1}$. If the beam diameters $B_{-1}$ and $B_{+1}$ are within 10% or less of each other then the instability zone may be considered to have been substantially removed. For example, if the beam diameters $B_{-1}$ and $B_{+1}$ are within 5% or less of each other then the instability zone may be considered to have been substantially removed.

An analogous comparison compares the power of the laser beam at the pump power $P_{-1}$ and the pump power $P_{+1}$. If the power of the laser beam at the pump power $P_{-1}$ is within 10% or less of the power of the laser beam at the pump power $P_{+1}$ then the instability zone may be considered to have been substantially removed. For example, if the power of the laser beam at the pump power $P_{-1}$ is within 5% or less of the power of the laser beam at the pump power $P_{+1}$ then the instability zone may be considered to have been substantially removed.

In some embodiments the instability zone may be further narrowed. For example, in some embodiments one or more plates may be positioned in a cavity of a laser. The one or more plates may have one or more apertures formed in them which allow a laser beam to pass through the one or more plates. One or more plates through which apertures are formed may lead to a further narrowing of an instability zone. For example, an instability zone may be narrowed such that the difference between the beam diameter $B_{-1}$ and the beam diameter $B_{+1}$ is less than 2% or less than 1%. Similarly, the instability zone may be narrowed such that the difference between the power of the laser beam at the pump power $P_{-1}$ and the power of the laser beam at the pump power $P_{+1}$ is less than 2% or less than 1%.

Reference is made throughout this document to a laser beam 9 being focussed symmetrically within a cavity 2. In this context symmetrical focussing of a laser beam 9 may be understood to mean that the beam diameters of the laser beam at each end mirror of the cavity tend to a minimum or infinity at substantially the same pump power. For example, if the beam diameter 113 which is depicted in FIG. 8 is the beam diameter of the laser beam at an end mirror of a cavity 2 then, in the case of symmetrical focussing of the laser beam 9, the beam diameter of the laser beam at the other end mirror of the cavity 2 will tend to either infinity or first to a minimum and then to infinity at the same pump power $P_0$ at which the beam diameter 113 reaches a minimum or tends to infinity. In general, the beam diameter of the laser beam at one end mirror will tend to infinity and the beam diameter at the other end mirror will tend to a minimum and then tend to infinity. Whilst embodiments of the invention have been described in the context of symmetrical focussing it will be appreciated that perfectly symmetrical focussing is just an example of how an instability zone may be substantially removed. In practice the focussing of a laser beam may differ from perfectly symmetrical focussing. In particular perfectly symmetrical focussing may break down at pump powers which are close to a fluctuation region 191.

In some embodiments a laser may have astigmatism. That is, the focussing of the laser beam 9 may be different in different planes. In such an embodiment the ranges of the power of the pump beams 7a, 7b at which the laser beam 9 is unstable may be different in different focussing planes. It may therefore be advantageous to reduce the ranges of powers of the pump beam 7a, 7b at which the laser beam 9 is unstable independently in different focussing planes. This may be achieved, for example, by using astigmatic optics such as cylindrical lenses and/or curved mirrors upon which the laser beam 9 is incident at a non-zero angle of incidence.

In an embodiment the first gain medium 3a may be positioned approximately at the centre of the first arm 2a of the cavity 2 and the second gain medium 3b may be positioned approximately at the centre of the second arm 2b of the cavity 2. In such an embodiment the focussing of the laser beam 2 may be approximately symmetrical within each arm 2a, 2b of the cavity as well as within the cavity 2 as a whole. This may increase the number of stability zones which may be reached. For example, such an arrangement may allow four different stability zones to be reached.

An embodiment has been described above in which the thermal lenses in both of the first and second gain media 3a, 3b are controlled by adjusting the polarisation direction of both of the first and second pump beams 7a, 7b with first and second wave plates 33a, 33b. In some embodiments only the polarisation direction of one of the first and second pump beams 7a, 7b may be adjusted. For example, the polarisation direction of the first pump beam 7a may not be adjusted and the polarisation direction of the second pump beam 7b may be adjusted.

In some embodiments the polarisation direction of the first pump beam 7a which is incident on the first gain medium 3a and the polarisation direction of the second pump beam 7b which is incident on the second gain medium 3b may be constant at different powers of the pump beam 7. The constant polarisation directions may for example result in thermal lenses with desired strengths in the gain media 3a, 3b across a desired range of powers of the pump beam 7. In other embodiments the polarisation state of the first and/or the second pump beams 7a, 7b may be adjusted with changes in the powers of the pump beam 7. For example, as the power of the pump beam 7 is increased the first and/or the second wave plate 33a, 33b may be adjusted so as to change the polarisation state of the first and/or the second pump beam 7a, 7b so as to control the strength of the thermal lenses in the gain media 3a, 3b differently for different powers of the pump beam 7.

It should be appreciated from, for example, FIG. 5 that a cavity 2 which is asymmetric about the geometric centre of the cavity (e.g. due to having a concave end mirror as is the case in FIG. 5) may still support a stable laser beam 9 at a range of powers of the pump beam 7 without controlling the thermal lenses in the first and second gain media 3a, 3b. For example, for powers of the pump beam 7 which lie in the first stability zone 17a or the second stability zone 17b of FIG. 5 no adjustment of the first and second pump beams 7a, 7b may be needed since the laser beam 9 is already stable at these powers. The first and second wave plates 33a, 33b may therefore apply no adjustment (or may apply a constant adjustment) to the polarisation states of the first and second pump beam 7a, 7b at powers of the pump beam 7 which lie in the first and second stability zones 17a, 17b. However as the power of the pump beam 7 approaches the instability zone 19 which is shown in FIG. 5 the first and/or the second wave plates 33a, 33b may adjust the polarisation sate of the first and/or the second pump beams 7a, 7b so as to cause thermal lenses in the gain media 3a, 3b which cause the focussing of the laser beam 9 to be substantially symmetric such that the laser beam 9 remains stable at powers of the pump beam 7 which lie in the instability zone 19 of FIG. 5.

In general achieving symmetric focussing of the laser beam 9 may only be one of many solutions which cause the laser beam 9 to be stable. It will be appreciated that for a given layout of the cavity 2 there may be one or more combinations of the strengths of the thermal lenses of the gain media 3a, 3b at different powers of pump radiation which result in a stable laser beam 9. The relative strengths of the thermal lenses of the gain media 3a, 3b may be adjusted (e.g. by adjusting the polarisation states of the first and/or the second pump beams 7a, 7b) such that one of these solutions is achieved. In some embodiments this may result in symmetric focussing of the laser beam 9. However in other embodiments the laser beam 9 may remain stable at some pump powers without symmetric focussing of the laser beam 9. In general it is desirable to balance the focussing of a laser beam 9 at different points in a cavity 2 so as to increase a range of powers of pump radiation at which the laser beam 9 is stable and substantially remove an instability zone.

Embodiments have been described above in which the strength of the thermal lenses of the first and/or the second gain media are independently controlled by adjusting the polarisation state of the first and/or the second pump beams 7a, 7b relative to crystal axes of the gain media 3a, 3b. However in other embodiments other means of independently controlling the strength of the thermal lenses may be used. For example, the relative powers of the pump beams 7a, 7b may be adjusted such that they are different from each other such that the thermal lenses of the gain media 3a, 3b are different from one another. For example, the first pump beam 7a may be output from a first radiation source (e.g. a first laser diode) and the second pump beam 7b may be output from a second radiation source (e.g. a second laser diode). The first and second radiation source may be independently controlled so as adjust the power of the first and second pump beams 7a, 7b which are incident on the first and second gain media 3a, 3b so as to independently control the strength of the thermal lenses of the first and second gain media 3a, 3b.

In some embodiments the thermal lenses of the gain media 3a, 3b may be controlled by adjusting the focusing of the first and second pump beams 7a, 7b into the gain media 3a, 3b. For example, the first lens 31a and/or the second lens 31b which are shown in FIG. 6 may be moveable (e.g. using one or more actuators) along the direction of propagation of the pump beams 7a, 7b so as to adjust the focusing of the pump beams 7a, 7b into the gain media 3a, 3b. Focussing pump beams 7a, 7b so as to narrow the beam width of the pump beams 7a, 7b which is incident on a gain media 3a, 3b may result in a different strength of thermal lens in the gain media 3a, 3b. The focal position of the pump beams 7a, 7b relative to the gain media 3a, 3b may also affect the strength of the thermal lenses in the gain media 3a, 3b and may be adjusted in order to control the strength of the thermal lenses.

A specific embodiment has been described above in which the first and second gain media 3a, 3b are uniaxial or biaxial crystals. This allows the strength of thermal lenses in the gain media 3a, 3b to be controlled by controlling the polarisation state of pump beams 7a, 7b relative to different crystal axes of the gain media 3a, 3b. However, it will be appreciated that in embodiments in which the strength of a thermal lens is controlled by other means the gain media 3a, 3b need not be uniaxial or biaxial crystals. For example, in an embodiment in which thermal lenses in the first and second gain media 3a, 3b are controlled by controlling the power of the first and second pump beams 7a, 7b or by controlling the focussing of the first and second pump beams 7a, 7b into the gain media 3a, 3b the gain media 3a, 3b may, for example, be formed from isotropic crystals. For example, the first and second gain media 3a, 3b may be isotropic Nd:YAG crystals.

In general the thermal lens of at least one of the first and second gain media 3a, 3b may be controlled by adjusting a property of at least one of the first and second pump beams 7a, 7b. One or more properties of the first and/or the second pump beams 7a, 7b may be adjusted and may include the polarisation state, the power and/or the focussing of the first and/or the second pump beams 7a, 7b. In general any control apparatus may be used to adjust a property of the first and/or the second pump beams 7a, 7b. A control apparatus may, for example, comprise one or more wave plates (e.g. the first and second wave plates 33a, 33b which are depicted in FIG. 6), one or more actuators configured to move one or more lenses (e.g. the first and second lenses 31a, 31b which are depicted in FIG. 6) and/or a control apparatus configured to adjust the power of the first and/or the second pump beams 7a, 7b. The control apparatus may include a controller. A controller 101 is shown in FIG. 6 as providing control signals 103 to the first and second wave plates 22a, 33b.

Embodiments have been described above with reference to FIG. 6 in which the cavity 2 is intentionally arranged so as to be asymmetric about the geometric centre of the cavity before adjustment of the thermal lenses of the gain media 3a, 3b. For example, an embodiment was described in which the one of the end mirrors 5a, 5b is a concave mirror and the other end mirror is a plane mirror. As was described above intentionally arranging a cavity 2 so as to be asymmetric may be advantageous since it may allow a laser beam 9 to be stable in the cavity at low powers of the laser beam 9 which may, for example, be convenient for aligning components of the cavity 2. An additional advantage may be that by introducing an intentional asymmetry a focussing of the laser beam 9 in the cavity 2 which adjusts for the known asymmetry and allows the laser beam 9 to be stable may be easily determined. The thermal lenses of the gain media 3a, 3b may then be independently controlled in order to bring about the desired focussing of the laser beam 9.

An intentional asymmetry which is introduced into the cavity may be relatively small. For example a cavity 2 may be arranged such that it is close to being symmetrical but with a small intentional offset of one or more components of the cavity 2 so as to make the cavity 2 asymmetric. In some embodiments a cavity may be arranged to be asymmetric by using one end mirror 5a, 5b which has a small curvature. Alternatively the end mirrors 5a, 5b may both be curved but may have different radii of curvature. In some embodiments the first and second arms 2a, 2b of the cavity may be arranged such that they have slightly different lengths. For example, the difference between the lengths of the first and second cavity arms 2a, 2b may be less than about 5 mm. In some embodiments the difference between the lengths of the first and second cavity arms 2a, 2b may be between about 1.5 mm and about 3 mm, between about 1 mm and about 1.5 mm, between about 0.1 mm and 0.5 mm or less than about 0.1 mm. It will be appreciated that a desirable difference between the lengths of the first and second cavity arms 2a, 2b may be different for different cavities. A difference between the lengths of the first and second cavity arms 2a, 2b may, for example, be determined for a given cavity by computer simulation of the cavity.

In some embodiments an intentional asymmetry may be introduced to the cavity 2 by arranging the cavity such that the distance between the first gain medium and the geometric centre of the cavity 2 is different to the distance between the second gain medium 3a and the geometric centre of the cavity 2. For example, in some embodiments the difference between the distance between the first gain medium 3a and the geometric centre of the cavity 2 and the distance second gain medium 3b and the geometric centre of the cavity 2 may be less than about 10% of the length of the cavity 2. For example, the difference between the distance between the first gain medium 3a and the geometric centre of the cavity 2 and the distance between the second gain medium 3b and the geometric centre of the cavity 2 may be between about 3% and about 10%, may be between about 1% and about 3% or may be less than about 1% of the length of the cavity 2.

It will be appreciated that a desirable difference between the distance between the first gain medium 3a and the geometric centre of the cavity 2 and the distance between the second gain medium 3b and the geometric centre of the cavity 2 may be different for different cavities and may, for example, be determined for a given cavity by computer simulation of the cavity.

In some embodiments the length of the first gain medium 3a may be slightly different to the length of the second gain medium 3b. This may cause the cavity 2 to be intentionally slightly asymmetric about the geometric centre of the cavity 2. In some embodiments intentional asymmetry in the cavity 2 may be brought about by doping the first gain medium 3a and the second gain medium 3b with different concentrations of dopant. One or more properties of the first and/or the second pump beams 7a, 7b may then be adjusted in order to control the thermal lenses of the first and/or the second gain media 3a, 3b so as to cause the focussing of the laser beam 9 to be stable over an increased range of powers of the pump beam 7.

In some embodiments an intentional asymmetry which may be introduced in a cavity may be counteracted by introducing another asymmetry. For example, with reference to FIG. 6, the first end mirror 5a may be a concave mirror thereby introducing an asymmetry into the cavity 2. This asymmetry may be counteracted, for example, by moving the second gain medium 3b away from the central mirror 29 such that the distance between the second medium 3b and the central mirror 29 is greater than the distance between the first gain medium 3a and the central mirror 29. The combination of the concave first end mirror 5a and the relative positions of the gain media 3a, 3b may be such that the laser beam 9 is focussed symmetrically in the cavity 2.

Various ways of arranging a cavity 2 such that it is intentionally asymmetric before it is pumped with the first and second pump beams 7a, 7b have been described above. It may be advantageous for the cavity 2 to initially be close to being symmetric such that if the first and second gain media were to be pumped with identical first and second pump beams 7a, 7b then a relatively narrow instability zone 19 would exist in the power curve of the laser 1. Such a narrow instability zone 19 can be seen, for example, in FIG. 5. A relatively small adjustment may then be made to one or more properties of the first and/or the second pump beam 7a, 7b so as to independently control the thermal lenses in the first and/or the second gain media 3a, 3b so as to reduce or substantially remove the instability zone 19.

Whilst a specific embodiments of a laser 1 have been described above and depicted, for example, in FIGS. 3 and 6, a laser 1 may include other components than those which are shown and have been described. For example, one or more plates may be positioned in a cavity 2 of a laser 1. The one or more plates (which may be referred to as aperture plates) may have one or more apertures formed in them which allow a laser beam 9 to pass through the one or more plates. The one or more aperture plates may be configured to restrict the mode size or cross-section of a laser beam 9 which is allowed to successively reflect between end mirrors 5a, 5b of the cavity 2. The one or more aperture plates may therefore restrict the transverse modes of the laser beam 9 which are allowed to propagate in the cavity 2. For example, one or more aperture plates may be configured such that only a fundamental transverse mode $TEM_{00}$ is allowed to propagate in the cavity 2. Restricting the cross-section of a laser beam 9 with one or more aperture plates may affect the powers of pump beam 7 at which the laser beam 9 is stable. For example, restricting the cross-section of the laser beam 9 with one or more aperture plates may act to narrow or further narrow an instability zone.

A laser 1 may include one or more frequency doubling crystals (e.g. a lithium triborate (LBO) crystal) positioned in the cavity 2. A frequency doubling crystal acts to double the frequency (and half the wavelength) of the laser beam 9 in the cavity 2. A frequency doubling crystal which is positioned in the cavity 2 may act to change the effective optical length of the cavity 2. That is if a frequency doubling crystal is positioned in a first arm 2a of an otherwise symmetric cavity 2 then the frequency doubling crystal may cause an asymmetry in the focussing of the laser beam 9 in the cavity 2. The focussing of the laser beam 9 in the cavity 2 may be made to be symmetric by adjusting the length of the first arm 2a of the cavity 2 in which the frequency doubling crystal is positioned.

The process of doubling the frequency of the laser beam 9 which occurs in a frequency doubling crystal may be strongly influenced by the beam diameter of the laser beam 9 in the frequency doubling crystal. For example, reducing the beam diameter of the laser beam 9 in a frequency doubling crystal may increase the intensity of a frequency doubled beam. However, the laser beam 9 and the frequency doubled beam may diverge from each other (this may be referred to as a spatial walk-off) in a frequency doubling crystal which may reduce the length over which the laser beam 9 and the frequency doubled beam interact with each other thereby reducing the intensity of the frequency doubled beam. The spatial walk-off between the beams may increase as the diameter of the laser beam 9 is decreased. There may therefore be an optimal diameter of the laser beam 9 in a frequency doubling crystal which results in a frequency doubled beam of a desired intensity. It may therefore be desirable to control the beam diameter of the laser beam 9 in a region of the cavity 2 in which a frequency doubling crystal is positioned.

In some embodiments the temperature of a frequency doubling crystal may be controlled in order to reduce the effect of any instability zones. The efficiency with which pump radiation is converted to frequency doubled radiation is a function of the temperature of the frequency doubling crystal. As the power of the pump radiation is increased the laser may approach an instability zone. In order to limit the effect of the instability zone the power of the pump radiation may be increased with a step change so as to skip past powers of the pump radiation which correspond to the instability zone. In order to avoid a corresponding step change in the power of the frequency doubled beam, the temperature of the frequency doubling crystal may be changed in order to decrease the efficiency of the frequency doubling crystal. This may allow powers of the frequency doubling beam which normally correspond to powers of the pump radiation which lie in an instability zone to be achieved without entering an instability zone. The temperature of the frequency doubling crystal may be controlled, for example, by positioning the frequency doubling crystal in a mount whose temperature can be controlled. For example the frequency doubling crystal may be positioned in a mount whose temperature is controlled with a Peltier heat pump.

A laser 1 may additionally or alternatively include one or more sum frequency mixing crystals configured to sum the frequency of two laser beams in a cavity. For example, a frequency doubling crystal and a sum frequency mixing crystal may be positioned in the same cavity. The frequency doubling crystal may double the frequency the laser beam so as to cause emission of a beam which has double the frequency of the laser beam. The sum frequency mixing crystal may sum the frequency of the laser beam and frequency doubled beam so as to emit a third beam whose frequency is equal to the sum of the frequency of the laser beam and the frequency of the frequency doubled beam, thereby resulting in a beam having a frequency which is three times the frequency and one third of the wavelength of the laser beam.

Alternatively a sum frequency mixing crystal may be positioned in a cavity without a frequency doubling crystal. An externally generated laser beam may be passed through the cavity such that the sum frequency mixing crystal sums the frequency of the externally generated laser beam and a laser beam which is generated in the cavity so as to form a new beam. The externally generated laser beam may not be resonant in the cavity and may only pass through the cavity in a single or a double pass.

In an embodiment two or more lasers may share part of a cavity. A sum frequency mixing crystal may be positioned in a part of a cavity which is shared by two or more lasers. The sum frequency mixing crystal may sum the frequencies of laser beams which are produced in each of the two or more lasers.

Whilst embodiments of a laser have been described which comprise a first gain medium 3a and a second gain medium 3b, it should be appreciated that a laser may comprise more than two gain media without departing from the scope of the claimed invention. For example, in some embodiments four gain media may be positioned in a cavity of a laser. A radiation source may provide a pump beam which may be split (e.g. using one or more beam splitters) into four independent pump beams. Each independent pump beam may be directed to be incident on one of the four gain media. At least one property (e.g. polarisation state, power and/or focussing) of one or more of the independent pump beams may be adjusted in order to control a thermal lens of one or more of the gain media such that a range of powers of the pump beam at which a laser beam is stable in the cavity can be varied and in particular increased. In an alternative embodiment a laser may comprise a plurality of radiation sources each configured to provide at least one pump beam which may be directed to one or more gain media in a cavity. In some embodiments other numbers of gain media may be positioned in a cavity. For example, three gain media or more than four gain media may be positioned in a cavity.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the appended claims.

The invention claimed is:

1. A laser comprising:
a first end mirror and a second end mirror defining an optical cavity therebetween;
a first gain medium and a second gain medium positioned in the optical cavity;
at least one radiation source configured to provide pump radiation to the first and second gain media, wherein the pump radiation comprises a first pump beam directed to be incident on the first gain medium and a second pump beam directed to be incident on the second gain medium so as to stimulate emission of radiation from the first and second gain media thereby establishing a laser beam in the optical cavity; and
a control apparatus operable to adjust a property of at least one of the first and second pump beams and thereby control a thermal lens of at least one of the first and second gain media such that an instability zone from the power curve of the laser is substantially removed and the thermal lens of the first gain medium has a different strength to the thermal lens of the second gain medium.

2. The laser of claim 1, wherein the control apparatus is operable to adjust a property of the first and second pump beams and thereby control a thermal lens of at least one of the first and second gain media such that the laser beam is focussed symmetrically in the optical cavity.

3. The laser of claim 1, wherein at least one of the end mirrors comprises a concave mirror.

4. The laser of claim 1, wherein the optical cavity is asymmetric about a geometric centre of the optical cavity.

5. The laser of claim 4, wherein a distance between the first gain medium and the geometric centre of the cavity and a distance between the second gain medium and the geometric centre of the cavity are different from one another.

6. The laser of claim 5, wherein the difference between the distance between the first gain medium and the geometric centre of the cavity and the distance between the second gain medium and the geometric centre of the cavity is less than about 10% of the length of the optical cavity.

7. The laser of claim 4, wherein the first gain medium and the second gain medium are each doped with a quantity of dopant and wherein a concentration of dopant in the first gain medium is different to a concentration of dopant in the second gain medium.

8. The laser of claim 1, wherein the control apparatus is operable to adjust the power of at least one of the first and second pump beams.

9. The laser of claim 8, wherein the at least one radiation source comprises a first radiation source configured to provide the first pump beam and a second radiation source configured to provide the second pump beam and wherein the control apparatus is operable to adjust the power of at least one of the first and second pump beams provided by the first and second radiation sources.

10. The laser of claim 1, wherein the first and second pump beams are linearly polarised and the control apparatus is operable to adjust the polarisation direction of at least one of the first and second pump beams.

11. The laser of claim 10, wherein the first and second gain media comprise crystals having crystal axes and wherein the strength of the thermal lenses of the first and second gain media are dependent on the relative alignment of the polarisation directions of the first and second pump beams and the crystal axes of the first and second gain media.

12. The laser of claim 1, wherein the laser further comprises a polarising beam splitter configured to receive a main pump radiation beam from the at least one radiation source and split the main pump radiation beam into the first pump radiation beam and the second pump radiation beam, wherein the first pump radiation beam has a first polarisation direction and the second pump radiation beam has a second polarisation direction which is substantially orthogonal to the first polarisation direction.

13. The laser of claim 12, wherein the at least one radiation source is configured to provide a main pump radiation beam which is substantially unpolarised and direct the main pump radiation beam to be incident on the polarising beam splitter.

14. The laser of claim 1, wherein the laser further comprises at least one lens configured to focus at least one of the first and second pump beams into at least one of the first and second gain media.

15. The laser of claim 14, wherein the control apparatus is operable to adjust the focussing of at least one of the first and second pump beams into at least one of the first and second gain media.

16. A method of producing a laser beam, the method comprising:
   providing an optical cavity with pump radiation comprising a first pump beam and a second pump beam
   directing the first pump beam to be incident on a first gain medium positioned in the optical cavity and directing the second pump beam to be incident on a second gain medium positioned in the optical cavity so as to stimulate emission of radiation from the first and second gain media thereby establishing a laser beam in the optical cavity;
   adjusting a property of at least one of the first and second pump beams and thereby control a thermal lens of at least one of the first and second gain media so as to substantially remove an instability zone from the power curve of the laser, wherein the property of at least one of the first and second pump beams is adjusted such that a strength of the thermal lens of the first gain medium is different to a strength of the thermal lens of the second gain medium.

17. The method of claim 16, wherein a property of at least one of the first and second pump beams is adjusted such that the laser beam is focussed symmetrically about a geometric centre of the optical cavity.

18. The method of claim 16, wherein adjusting a property of at least one of the first and second pump beams comprises adjusting a polarisation direction of at least one of the first and second pump beams.

19. The method of claim 16, wherein adjusting a property of at least one of the first and second pump beams comprises adjusting the power of at least one of the first and second pump beams.

* * * * *